United States Patent
Burghardt et al.

(10) Patent No.: US 7,239,623 B2
(45) Date of Patent: Jul. 3, 2007

(54) METHOD FOR TRANSFERRING MESSAGES BETWEEN COMMUNICATION TERMINALS

(75) Inventors: Frank Burghardt, Berlin (DE); Bertolt Eicke, Berlin (DE); Jens Schendel, Berlin (DE); Jens Lehmann, Falkensee (DE)

(73) Assignee: Siemens Aktiengesellschaft, Munich (DE)

( * ) Notice: Subject to any disclaimer, the term of this patent is extended or adjusted under 35 U.S.C. 154(b) by 540 days.

(21) Appl. No.: 10/901,432

(22) Filed: Jul. 29, 2004

(65) Prior Publication Data
US 2005/0058070 A1  Mar. 17, 2005

(30) Foreign Application Priority Data
Jul. 31, 2003  (DE) ................. 103 35 432

(51) Int. Cl.
*H04Q 7/24* (2006.01)
(52) U.S. Cl. ................ 370/338; 370/351; 370/412; 455/406; 455/414.1; 379/114.1
(58) Field of Classification Search ................ 370/338, 370/351, 412; 455/406, 414.1; 379/114.1
See application file for complete search history.

(56) References Cited

U.S. PATENT DOCUMENTS

| | | | |
|---|---|---|---|
| 5,995,822 A | 11/1999 | Smith et al. | |
| 7,010,574 B1 * | 3/2006 | Chang et al. | 709/206 |
| 7,088,990 B1 * | 8/2006 | Isomursu et al. | 455/412.1 |
| 2002/0029189 A1 | 3/2002 | Titus et al. | |
| 2002/0102999 A1 | 8/2002 | Maggenti et al. | |
| 2002/0116338 A1 | 8/2002 | Gonthier et al. | |
| 2003/0014315 A1 * | 1/2003 | Jaalinoja et al. | 705/18 |
| 2003/0037176 A1 | 2/2003 | Dannehr et al. | |
| 2003/0074312 A1 * | 4/2003 | White | 705/40 |
| 2003/0078031 A1 | 4/2003 | Masuda | |

(Continued)

FOREIGN PATENT DOCUMENTS

DE   101 42 868 A1   4/2003

(Continued)

OTHER PUBLICATIONS

Proctor, T.; K.: Evolution to 3G Services: Provision of 3G Services over GERAN (GSM/EDGE Radio Access Network). In: Proceedings of Fourth International Conference on 3G Mobile Communication Technologies (3G 2003), London Jun. 25-27, 2003, ISSN 0537-9989. IEE, Stevenage, GB, 78-82.

*Primary Examiner*—Danh Le
(74) *Attorney, Agent, or Firm*—Morrison & Foerster LLP

(57) ABSTRACT

The invention relates to a method for transferring messages between communication terminals, including a control computer controlling message transfer which transfers a token to a first communication terminal and grants the first communication terminal authorization to transmit a message, and transfers a reservation message to a charging system, which asks the charging system to reserve resources for charging for the transfer of the message. After receiving the token, the first communication terminal starts to transmit the message, which is addressed to a second communication terminal, and portions of the message which have been transmitted by the first communication terminal are transferred to the control computer and are buffer-stored therein, and after receiving a reservation confirmation message transferred to the control computer by the charging system upon successful reservation the control computer transfers the message to the second communication terminal.

17 Claims, 1 Drawing Sheet

U.S. PATENT DOCUMENTS

| | | |
|---|---|---|
| 2003/0101135 A1 | 5/2003 | Myatt et al. |
| 2003/0196087 A1* | 10/2003 | Stringer et al. ............. 713/171 |
| 2004/0019539 A1 | 1/2004 | Raman et al. |
| 2004/0236686 A1 | 11/2004 | Bohmer et al. |
| 2005/0025124 A1* | 2/2005 | Mitsumori et al. ......... 370/352 |
| 2006/0008063 A1* | 1/2006 | Harnesk et al. ........ 379/114.01 |
| 2006/0209873 A1* | 9/2006 | Knabchen et al. .......... 370/443 |
| 2007/0059969 A1* | 3/2007 | Shamoto ..................... 439/352 |

FOREIGN PATENT DOCUMENTS

| | | |
|---|---|---|
| WO | WO-01-67787 A2 | 9/2001 |
| WO | WO-2004-010393 A1 | 1/2004 |

* cited by examiner

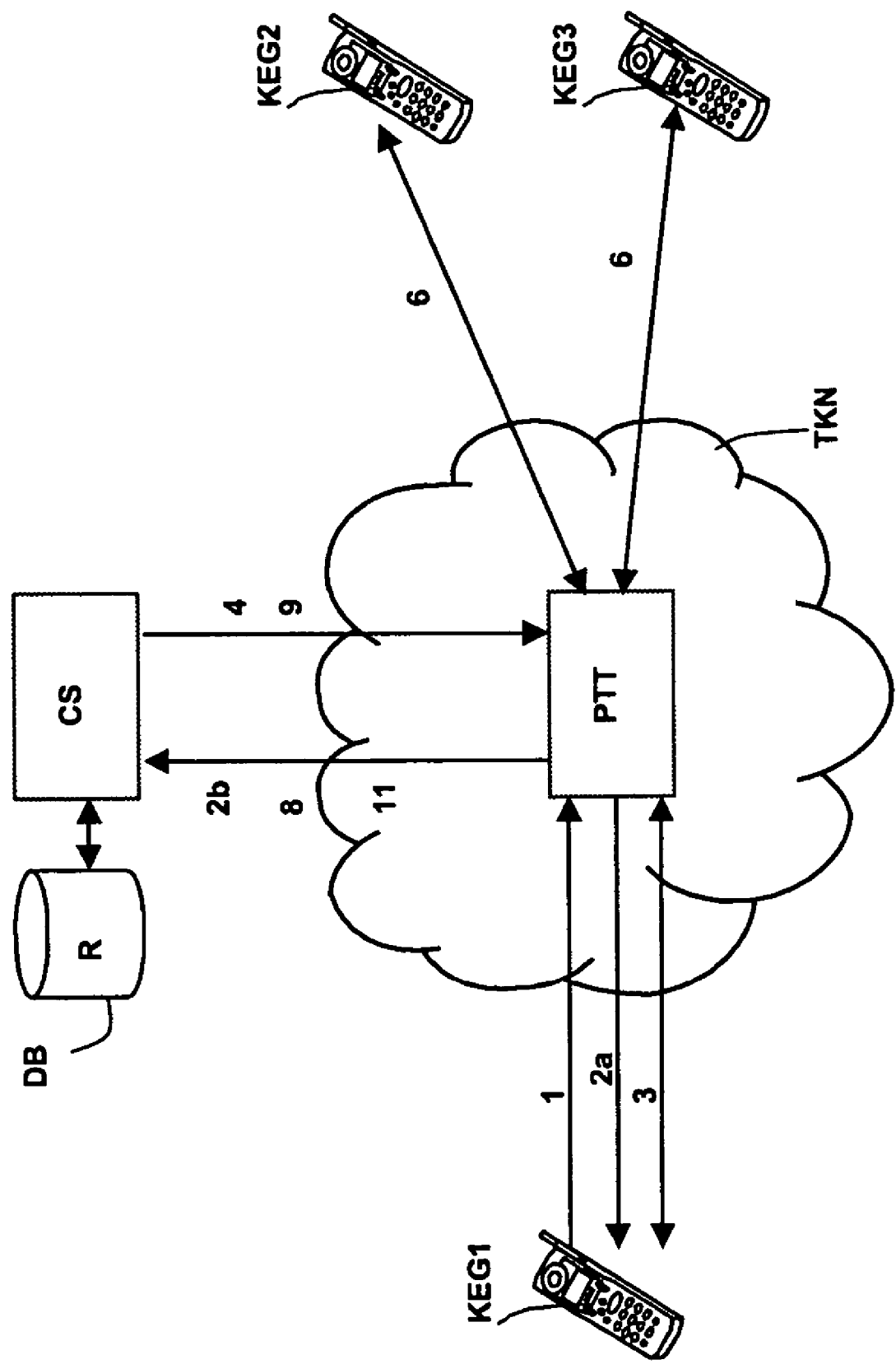

METHOD FOR TRANSFERRING MESSAGES BETWEEN COMMUNICATION TERMINALS

CLAIM FOR PRIORITY

This application claims the benefit of priority to German Application No. 103 35 432.8, filed in the German language on Jul. 31, 2003, the contents of which are hereby incorporated by reference.

TECHNICAL FIELD OF THE INVENTION

The invention relates to a method for transferring messages between communication terminals.

BACKGROUND OF THE INVENTION

Methods for transferring messages between communication terminals in telecommunication networks in which the communication terminals involved cannot send these messages at arbitrary times are known generally. Instead, the communication terminals obtain authorization to send such a message at particular times. This is the case, by way of example, when transferring messages between communication terminals in the form of mobile radios ("walkie talkies"). This is-because such a radio is not able to send a (voice) message to a second communication terminal at arbitrary times. Instead, the radio is not granted authorization to send the voice message until after a special talk key has been pressed. Only then does the communication terminal transfer a message (e.g. a voice message from a user of the communication terminal) to the destination communication terminal. During this transfer of the message from the sender radio to the destination radio, the destination radio is not able to send a message to the sender radio. In addition, charging systems in telecommunication networks are known generally which can be used to invoice the relevant communication terminals or the users of the communication terminals for the transfer of messages.

SUMMARY OF THE INVENTION

The invention discloses a method for transferring messages between communication terminals in which the incorporation of a charging system affects the speed of the message transfer only slightly.

In one embodiment of the invention, there is a method for transferring messages between communication terminals, in wheih:
  a control computer controlling message transfer transfers a token to a first communication terminal, which grants the first communication terminal authorization to transmit a message, and transfers a reservation message to a charging system, which asks the charging system to reserve resources for charging for the transfer of the message,
  after receiving the token the first communication terminal starts to transmit the message, which is addressed to a second communication terminal,
  portions of the message which have been transmitted by the first communication terminal are transferred to the control computer and are buffer-stored therein, and
  after receiving a reservation confirmation message transferred to the control computer by the charging system upon successful reservation the control computer transfers the message to the second communication terminal.

One advantage in this context is that the token and the reservation message are transferred to the communication terminal or to the charging system in real time. This means that the communication terminal can start to send the message and, at the same time, the charging system can take the necessary steps to reserve resources. Even if the charging system requires a significant period for this reservation, this period can advantageously be used for actually transferring at least portions of the message from the communication terminal to the control computer; the message portions are thus reserved and transferred to the control computer at parallel times or simultaneously. As soon as the control computer is informed of successful reservation by the charging system using the reservation confirmation message, the control computer actually has these portions of the message, which can be transferred to the message transfer destination in the form of the second communication terminal without any time delay. Hence, incorporation of the charging system does not result in any significant delays for transfer of the messages.

In one aspect of the invention, the resources reserved may be portions of a prepaid credit. This allows the invention to be advantageously performed using prepaid credits which arise, by way of example, in connection with "prepaid accounts".

In another embodiment of the invention, the reservation confirmation message is used to transfer information about a confirmed period to the control computer, and the control computer transfers the message to the second communication terminal until the transfer time reaches the confirmed period. In this context, the control computer advantageously transfers the message no longer than for the confirmed period (which is obtained, by way of example, from the level of the reserved resources, such as from the level of a reserved fund).

In still another embodiment of the invention, shortly before the confirmed period expires, the control computer transfers a further reservation message to the charging system, which asks the charging system for further reservation of further resources for charging for the transfer of the message, and upon or after successful further reservation a further reservation confirmation message is then-transferred to the control computer. This allows even very long or large messages to be transferred to the second communication terminal.

In the invention, a request message from the first communication terminal can prompt transfer of the token from the control computer to the first communication terminal. This means that the communication terminal can notify the control computer of when the communication terminal requires authorization for sending the message.

In still another embodiment of the invention, information about a confirmed period is transferred, the confirmed period being longer than the transfer time required for transferring the message, the control computer forms a difference between the confirmed period and the transfer time, and the control computer then retains a new confirmed period for transferring further messages, the new confirmed period corresponding to the difference. The effect advantageously achieved by transferring the information about a confirmed period of such a length is that this one (long) confirmed period is often adequate for transferring a plurality of messages. This means that transfer of the message to the second communication terminal during the new confirmed period can often be followed by transfer of a second message or even further messages to the second communication terminal, without the need for the charging system to make a new reservation for this second message or for these further messages. With an appropriate choice of (long) confirmed period, a new confirmed period which is of appropriate length and is sufficient for transferring further messages is thus obtained.

In another embodiment of the invention, the control computer continuously checks whether further messages are being transmitted by the first communication terminal within a pre-selected idle time, and if this is the case, the further messages are transferred and the transfer time required for this is determined, or if this is not the case, a charging message is transferred to the charging system, the charging message being used to transmit information about the transfer time required up until then and a request to terminate reservation of the resources to the charging system. The effect advantageously achieved by this is that charging for the messages transferred up until this time is then prompted for the first communication terminal on the basis of the transfer time required up until then if the first communication terminal does not send any messages for a particular length of time (namely for the length of the idle time). In addition, the resources reserved for this first communication terminal are then released again (the reservation of the resources is canceled or reversed) This prevents portions of the resources of the first communication terminal from unintentionally remaining reserved and hence no longer being able to be used by the first communication terminal (e.g. for using other services).

In this context, the charging system transfers information about the length of the idle time to be used to the control computer.

Alternatively, the control computer stipulates the length of the idle time on the basis of a local setting.

In the invention, receipt of the charging message can prompt the charging system to charge for the transfer of the message using the reserved resources.

In another embodiment, charging for transfer of the message takes place using resources which are associated with the first communication terminal or with its user and/or using resources which are associated with the second communication terminal or with its user. This advantageously allows the sender of the message or the receiver of the message or the sender and the receiver to be invoiced for charges for transferring the message.

In still another embodiment of the invention, the charging system handles the charging message using a low priority as compared with charging messages originating from other services. The effect which may advantageously be achieved by this is that small demands on the hardware of the charging system in terms of processing speed arise for charging for transfer of said messages, since the maximum permissible response times in the charging system can be proportioned to be relatively long on account of the low priority of the charging message.

The invention, in another embodiment, permits messages transferred by the control computer to be allocated the low priority, i.e. messages transferred from the control computer to the charging system can be handled using a low priority. In the case of this embodiment, the charging system may advantageously recognize that the low priority is to be applied solely from the sender of the messages.

Alternatively, in yet another embodiment, the control computer uses the charging message to transfer information about the level of the priority to be applied for this charging message to the charging system. In this context, the control computer may advantageously stipulate priority values and transfer them to the charging system on the basis of individual messages.

The invention, in another embodiment, the messages transferred from the control computer to the charging system are used to transfer information about the level of the priority to be applied for these messages to the charging system.

In still another embodiment of the invention, a confirmed period associated with the first communication terminal is transferred to the control computer, a confirmed period associated with the second communication terminal is transferred to the control computer, and the control computer transfers the message to the second communication terminal until the transfer time reaches the confirmed period associated with the first communication terminal or until the transfer time reaches the confirmed period associated with the second communication terminal. In the case of this embodiment, both the sender in the form of the first communication terminal and the receiver in the form of the second communication terminal may advantageously be invoiced for transferring the message. If a respective resource volume of appropriate size has been reserved both for the first and for the second communication terminal (and hence a confirmed period of appropriate length is available both for the first and for the second communication terminal) is the message transferred to the second communication terminal.

The invention may also be in a form such that the messages are transferred between the communication terminals in half-duplex mode. This allows the invention to be applied, by way of example, when using radios in the form of "walkie talkies" or when using radios with a "talk key".

BRIEF DESCRIPTION OF THE DRAWINGS

The invention is described below in more detail with reference to the drawings, in which:

FIG. 1 shows an exemplary embodiment for transferring messages between communication terminals.

DETAILED DESCRIPTION OF THE INVENTION

FIG. 1 shows a first communication terminal KEG1, a second communication terminal KEG2 and a third communication terminal KEG3, which may be radios in the form of "walkie talkies" or may be mobile telephones, for example. Between these communication terminals, a telecommunication session is set up and allows each communication terminal to send messages in the form of voice messages or other messages to the respective other communication terminals. In this context, the allocation of a token to just one respective communication terminal ensures that a plurality of communication terminals are not able to send messages simultaneously or that it is not possible to speak on a plurality of communication terminals simultaneously. This is because the communication terminal which has the token is able to send a message to the other communication terminals. The token is transferred from a control computer PTT to the respective communication terminal. This control computer controls the entire transfer of the messages between the communication terminals and ensures that a maximum of one communication terminal is allocated the token at any time.

In the exemplary embodiment, the communication terminals are in the form of mobile phones with a special "talk key" or "send key" (PTT key=Push-to-Talk key). When this key has been pressed, the control computer ascertains a suitable time for sending the message and then transfers the token to the communication terminal. The control computer (which is a service-providing server in a telecommunication network TKN) is connected to a charging system (CS). In the exemplary embodiment, this charging system is an "online charging system", i.e. a charging system which charges fees incurred for the transfer at the same time as the messages are being transferred. This charging system CS may be, by way of example, a service control point (SCP) in the telecommunication network TKN (which has a structure of an intelligent network), this service control point managing credit accounts (prepaid accounts) associated with the communication terminals KEG1, KEG2 and/or KEG3. To manage these credit accounts, the charging system CS is connected to a database DB which stores information about resources R which are suitable for charging for the transfer of the messages. In the exemplary embodiment, the resources R of this type which are stored are information about three different credits (e.g. in euros) which are associated with the first communication terminal KEG1 or its user, with the second communication terminal KEG2 or its user and with the third communication terminal KEG3 or its user.

The telecommunication network TKN may be a second or third generation mobile radio network, for example a GSM, GPRS or UMTS mobile radio network.

In the exemplary embodiment shown, voice messages are sent from the first communication terminal KEG1 to the second communication terminal KEG2 and also to the third communication terminal KEG3, and charging for the transfer of the messages takes place. This charging involves a fee being calculated on the basis of the time taken for the voice messages (billing), and in a simplified alternative method it is also possible for fixed flat-rate fees per transferred message to be charged by the charging system instead of the time-dependent fees. These fees are charged to the sender of the voice message (that is to say the first communication terminal KEG1 or its user) and/or to the receiver of the message (that is to say, by way of example, the second communication terminal KEG2 or its user or the third communication terminal KEG3 or its user).

The message transfer method involves the performance of "parallel reservation". In this context, in real time with the transfer of the token to the first communication terminal KEG1 (which grants the first communication terminal authorization to send the message) a reservation message is transferred to the charging system CS (which asks the charging system to reserve resources for charging for the transfer of the message). As soon as the token has been received, the first communication terminal KEG1 can record a voice message from a user using a built-in microphone and can send it as an electronic voice message to the second communication terminal KEG2. This voice message (possibly even portions of the voice message, for example if the voice message is transferred using inherently known streaming methods) arrives at the control computer PTT and is buffer-stored (buffered) there. Simultaneously with this data transfer, the charging system, having received the reservation message, reserves resources (for example in the form of units of money from prepaid credits) for charging for the transfer of this message. After successful conclusion of these reservation processes and after a reservation confirmation message confirming successful reservation has been sent from the charging system to the control computer are the portions of the message which are stored on the control computer transferred to the second communication terminal KEG2. This principle of parallel reservation (i.e. resources are reserved by the charging system simultaneously with the transfer of the next message or of the next message portion to the control computer and simultaneously with the buffer-storage of the next message or of the next message portion in the control computer) is also applied for any other messages or other message portions which come later. Parallel reservation significantly lowers the demands on the charging system in terms of its response time. Even with relatively long response times (i.e. when there is a comparatively long period between receipt of the reservation message by the charging system and sending of the reservation confirmation message, confirming successful reservation, by the charging system), the transfer of the messages between the first communication terminal KEG1 and the second communication terminal KEG2 is delayed insignificantly or not at all, because the time required for reservation by the charging system is already being used to transfer the message or the message portions from the first communication terminal KEG1 to the control computer PTT. In addition, parallel reservation significantly increases the service quality for the user of the first communication terminal KEG1, since this user can start to speak as soon as the token has been received, and the communication terminal KEG1 can start to send the voice message as soon as the token has been received. Hence, the user of the communication terminal KEG1 has the service available very quickly after the service request, even if the charging system CS has still not completed reservation. The invention thus has no need for complete reservation to have ended and for the reservation confirmation message to be available on the control computer before the service is started. Rather, the service is provided (or at least some of the service is provided) simultaneously with the reservation of charging resources by the charging system.

In addition, the invention involves the performance of "supplementary reservation". This supplementary reservation involves the online charging system CS notifying the control computer PTT of information about a confirmed period upon the first reservation request (using the reservation confirmation message) and possibly upon further reservation requests (using further reservation confirmation messages), the confirmed period being longer than the transfer time required for transferring the message. Such information about a confirmed period is also called a "time slice" or a "quota". This is an end-user-based time slice (that is to say one associated with the first communication terminal KEG1 and/or with the second communication terminal KEG2) which is decremented on the control computer PTT by the period of the voice messages sent by the first communication terminal KEG1 or by the period of the voice messages received by the second communication terminal KEG2. This is also referred to as "budget control". Such a time slice or confirmed period may thus comprise a length of time which is sufficient for a plurality of voice messages.

In addition to monitoring this confirmed period, the control computer PTT monitors an idle time (idle interval, idle-time-out). Monitoring of the idle time starts when transfer of the first voice message ends. If no further voice messages are sent by the first communication terminal KEG1 within the idle time (the communication terminal KEG1 or its user is idle at that time), then the control computer PTT transfers a charging message (request) to the charging system, and the charging system then calculates the time needed up until then for transferring the voice message(s) and cancels the possibly remaining residual reservation of resources (the resources which are still reserved at this time and are as yet unneeded are thus released).

At the end of the transfer of a voice message, the respective idle time starts to run from the beginning and is monitored until the transfer of a subsequent voice message starts. When the whole session for transferring the messages between the communication terminals is ended (by virtue of the communication terminals logging out of the mobile radio network, for example), then any resources which may still be reserved are released, i.e. reservations which then still exist and relate to the session are canceled.

Information about the length of the idle time which is to be used can be sent from the charging system CS to the control computer PTT. Alternatively, this length of the idle time may also be fixed by the control computer on the basis of a local setting.

In addition, the message transfer method involves the application of a "low-priority messages to the charging system" aspect, i.e. low-priority charging messages are sent from the control computer to the charging system, for example. The charging messages transferred from the control computer PTT to the charging system CS are then handled by the charging system using a low priority, i.e. the charging system can allow itself a relatively long time to respond to this charging request if required. There are reduced response time demands as compared with charging messages or charging requests originating from other services.

In this context, the charging system can allocate a low priority to all of the charging messages originating from the control computer PTT, that is to say in this case the charging system CS needs to ascertain only the sender of the charging messages and can use this sender information to allocate a low priority to the charging messages. In another embodiment of the inventive method, the control computer PTT uses the charging message to transfer information about the level of the priority to be applied for this charging message to the charging system CS.

The application of these low-priority charging messages results in the advantage that there are low demands on the charging system in terms of the response times which are to be implemented. This results in relatively low demands on the hardware of the charging system, which leads to low costs and simpler implementability of the charging system. This is because the costs which arise in the charging system are determined essentially by the necessary (maximum) response time per charging operation (charging latency) and by the number of charging operations per unit time. If appropriate, the charging system may also be used simultaneously for a plurality of other services which transfer charging messages with a relatively high priority to the charging system and which expect responses correspondingly more rapidly.

The "low-priority messages" method can be applied for all messages which are transferred from the control computer PTT to the charging system CS, that is to say, by way of example, for a reservation message 2b (described further below), a further reservation message 8 and a charging message 11.

The inventive method allows these three aspects "parallel reservation", "supplementary reservation" and "low-priority messages to the charging system" to be applied alone or else in combination, respectively. Parallel reservation improves the quality of service for the end user of the communication terminal KEG1, for whom the service of transferring messages is available very quickly (reduced call setup time). The use of the low-priority charging messages significantly reduces the response time demands on the charging system. This significantly reduces the capital expenditure for the operator of the charging system (reduced operator CAPEX (capital expenditure)). Application of the "supplementary reservation" reduces the number of charging operations in the charging system, which likewise relieves the load on the charging system. In addition, the service quality is improved for the end user of the first communication terminal KEG1 and also for the end users of the other communication terminals, since the service of transferring messages is available even more quickly if the supplementary reservation already performed at an early stage in the method means that there is no need to perform any additional reservation when transferring another message.

The text below uses the messages illustrated in the figure to explain an exemplary method cycle for the invention.

At the start of the method, there is the situation that a session for transferring messages (a "PTT session" (Push-to-Talk session)) has been set up between the first communication terminal KEG1, the second communication terminal KEG2 and the third communication terminal KEG3. Within this session, no messages have been interchanged yet, and at most the charging system has up to now charged fees for setting up the session. There is a need to send a voice message from the first communication terminal KEG1 to the second communication terminal KEG2 and to the third communication terminal KEG3. The reason for this is that the "send key" has been pressed on the first communication terminal KEG1, and hence a first need to send a message has been signaled. The first communication terminal KEG1 then transfers a request message to the control computer PTT (arrow 1), this request message including the information that the need to send a message exists.

Next, the control computer PTT controlling the message transfer transfers a token to the first communication terminal KEG1 (arrow 2a). This token grants the first communication terminal KEG1 authorization to send the voice message. In real time (ideally almost simultaneously), the control computer PTT transfers a low-priority reservation message to the charging system CS (arrow 2b). This reservation message asks the charging system CS to reserve resources for charging for the transfer of the voice message.

The charging system CS then ascertains a price which is to be set for transferring the voice message (in the simplest case, a flat-rate price per voice message is set or an average price is set for each voice message) and resources in the form of credit sums (which are dependent on the ascertained price) are reserved both in a credit account associated with the first communication terminal KEG1 and in credit accounts associated with the second communication terminal KEG2 and with the third communication terminal KEG3. Since the reservation message 2b originates from the control computer PTT, the reservation operations are performed using a low priority (low-priority charging message). This reservation involves greater credit sums being reserved than would be necessary on the basis of the ascertained price for transferring the first voice message. This is because the method makes the assumption that the first communication terminal KEG1, as the sender of the voice message, and the second communication terminal KEG2 and/or the third communication terminal KEG3, as receivers of the voice message, will subsequently continue to use the service of transferring messages in order to interchange further voice messages. The charging system CS now converts the reserved resources into confirmed periods which indicate the length of time for which a voice message may be transferred while using up the reserved resources (e.g. for each 0.10 euro of reserved resources for the sender and for the receiver it is possible to transfer a voice message for 1 minute). Information about the confirmed period (also called "granted quota") is then transferred to the control computer using a reservation confirmation message (arrow 4).

The time from allocation of the token to the first communication terminal up until arrival of the information about the confirmed period at the control computer has been used by the first communication terminal KEG1 to transfer at least portions of the voice message to the control computer PTT (arrow 3) using an inherently known streaming method (e.g. using the RTP/RTCP method; RTP/RTCP=Real-Time Transport Protocol/Real-Time Transport Control Protocol). These portions of the voice message (possibly even the entire voice message) have been buffer-stored (buffered) in the control computer. Alternatively, these portions of the voice message may also be buffer-stored at another storage node in the telecommunication network (for example on a media server).

As soon as the information about the confirmed period is available at the control computer PTT, the control computer PTT forwards the buffer-stored portions of the voice message to the second communication terminal KEG2 and to the third communication terminal KEG3 (arrows 6). The transfer time required for the transfer is measured by the control computer PTT. The control computer PTT transfers the voice message to the second communication terminal KEG2 and to the third communication terminal KEG3 until the transfer time required for the transfer reaches the confirmed period. Shortly before the confirmed period expires (i.e. shortly before the transfer time reaches the confirmed period), the control computer sends a further reservation message to the charging system CS, which asks the charging system for further reservation of further resources for transferring the voice message (arrow 8). (This situation may arise, by way of example, when the first voice message is much longer than a message length originally assumed when reserving the resources, which means that even the supplementary reservation made is no longer sufficient for complete message transfer.) The charging system then makes a further reservation of further resources in a known manner and sends a further reservation confirmation message with a further confirmed (longer) period to the control computer PTT (arrow 9). Any time spent waiting for the further reservation confirmation message is again used to transfer portions of the respective message to be transferred from the first communication terminal KEG1 to the control computer PTT and to buffer-store them there.

When transfer of the voice message to the communication terminals KEG2 and KEG3 ends, the control computer PTT forms a difference between the confirmed period and the required transfer time, and this difference (i.e. the confirmed time which has not yet been used) is stored as the new confirmed period for transferring further voice messages. The control computer then checks continuously (at prescribed times or at short intervals of time) whether further messages are being sent by the first communication terminal KEG1 within a preselected period (called idle time below). If this is the case, these further voice messages are transferred to their respective destination and the transfer time required for this is measured and deducted from the new confirmed period. In this case, it is not necessary to send additional reservation messages to the charging system CS. The transfer time can be determined by the control computer by also using the time for transferring the token to the appropriate transmission communication terminal, by virtue of this time being used as the start of transfer of the message.

If no further messages are sent by the first communication terminal during the pre-selected idle time, however, a low-priority charging message (arrow 11) is transferred to the charging system CS, this charging message being used to transfer information about the transfer time required up until then to the charging system CS and additionally to ask the charging system to terminate or cancel any reservations of resources which still exist.

Information about the length of the idle time to be used can be transferred from the charging system CS to the control computer PTT together with the reservation confirmation message 4 and/or the further reservation confirmation message 9. Alternatively, the control computer PTT can fix the length of the idle time on the basis of a local setting (e.g. default value: 30 minutes).

The charging message 11 transferred from the control computer PTT to the charging system CS and also other messages originating from the control computer PTT are handled by the charging system using a low priority.

By way of example, the following messages may be used in the inventive method:

Message 1: RTCP: App: Floor Request
Message 2a: RTCP: App: Floor Grant
Message 2b: Diameter: Accounting Request (Start_Record)
Message 3: RTP Streaming
Message 4: Diameter: Accounting Answer (Start_Record)
Message 6: RTCP: App: Floor Taken+RTP Streaming
Message 8: Diameter: Accounting Request (Interim_Record)
Message 9: Diameter: Accounting Answer (Interim_Record)
Message 11: Diameter: Accounting Request (Interim_Record)

The charging system CS can invoice both the first communication terminal KEG1, as a sender of the voice message, and, by way of example, the second communication terminal KEG2, as the receiver of the voice message, for fees for transferring the voice messages. Accordingly, the method may involve a confirmed period associated with the first communication terminal KEG1 being transferred to the control computer PTT with the reservation confirmation message 4, and a confirmed period associated with the second communication terminal KEG2 being transferred to the control computer PTT with the reservation confirmation message 4. The control computer transfers the appropriate voice message to the second communication terminal either until the ensuing transfer time reaches the confirmed period associated with the first communication terminal or until the ensuing transfer time reaches the confirmed period associated with the second communication terminal. After that, further reservation messages need to be transferred to the charging system for the first communication terminal or for the second communication terminal in order to ask the charging system for further reservation of further resources.

In the case of the invention, the messages are transferred between the communication terminals in half-duplex mode. This results in a method in which only one of the communication terminals is ever able to send a voice message at one time.

A particular advantage of the method described is that a high quality of service is achieved for the user of the communication terminals. This is because very short waiting times (short call setup times) arise both for the sender and for the receiver of the message. In addition, relatively low demands on the charging system in terms of the charging system's reaction times to reservation messages arise, since the (possibly somewhat longer) reaction time can actually be used for transferring the messages from the sender communication terminal KEG1 to the control computer PTT.

What is claimed is:

1. A method for transferring messages between communication terminals, comprising:

transferring a token to a first communication terminal, which grants the first communication terminal authorization to transmit a message, and transferring a reservation message to a charging system, which asks the charging system to reserve resources for charging for the transfer of the message;

after receiving the token, transmitting the message from the first communication terminal, which is addressed to a second communication terminal;

transferring portions of the message which have been transmitted by the first communication terminal to a control computer and buffer-storing therein; and after receiving a reservation confirmation message transferred to the control computer by the charging system upon successful reservation, transferring the message to the second communication terminal via the control computer.

2. The method as claimed in claim 1, wherein the resources reserved are portions of a prepaid credit.

3. The method as claimed in claim 1, wherein the reservation confirmation message is used to transfer information about a confirmed period to the control computer, and the control computer transfers the message to the second communication terminal until the transfer time reaches the confirmed period.

4. The method as claimed in claim 3, wherein a confirmed period associated with the first communication terminal is transferred to the control computer, a confirmed period associated with the second communication terminal is transferred to the control computer, and the control computer transfers the message to the second communication terminal until the transfer time reaches the confirmed period associated with the first communication terminal or until the transfer time reaches the confirmed period associated with the second communication terminal.

5. The method as claimed in claim 3, wherein information about a confirmed period is transferred, the confirmed period being longer than the transfer time required for transferring the message, the control computer forms a difference between the confirmed period and the transfer time, and the control computer retains a new confirmed period for transferring further messages, the new confirmed period corresponding to the difference.

6. The method as claimed in claim 5, wherein the control computer continuously checks whether further messages are being transmitted by the first communication terminal within a pre-selected idle time, and if the messages are transmitted, the further messages are transferred and the transfer time required is determined, or if the messages are not transmitted, a charging message is transferred to the charging system, the charging message being used to transmit information about the transfer time required up until then and a request to terminate reservation of the resources to the charging system.

7. The method as claimed in claim 6, wherein the charging system transfers information about the length of the idle time to be used to the control computer.

8. The method as claimed in claim 6, wherein the control computer stipulates the length of the idle time on the basis of a local setting.

9. The method as claimed in claim 6, wherein receipt of the charging message prompts the charging system to charge for the transfer of the message using the reserved resources.

10. The method as claimed in claim 9, wherein the charging system handles the charging message using a low priority.

11. The method as claimed in claim 10, wherein the control computer uses the charging message to transfer information about the level of the priority to be applied for the charging message to the charging system.

12. The method as claimed in claim 6, wherein charging for transfer of the message takes place using resources which are associated with the first communication terminal or its user and/or using resources which are associated with the second communication terminal or its user.

13. The method as claimed in claim 1, wherein shortly before the confirmed period expires, the control computer transfers a further reservation message to the charging system, which asks the charging system for further reservation of further resources for charging for the transfer of the message, and upon successful further reservation, a further reservation confirmation message is transferred to the control computer.

14. The method as claimed in claim 1, wherein a request message from the first communication terminal prompts transfer) of the token from the control computer to the first communication terminal.

15. The method as claimed in claim 1, wherein the messages transferred from the control computer to the charging system are handled using a low priority.

16. The method as claimed in claim 1, wherein the messages transferred from the control computer to the charging system are used to transfer information about the level of the priority to be applied for the messages to the charging system.

17. The method as claimed claim 1, wherein the messages are transferred between the communication terminals in half-duplex mode.

* * * * *